(No Model.) 2 Sheets—Sheet 1.
C. T. WHEDON.
DRYING HOUSE.
No. 262,870. Patented Aug. 15, 1882.
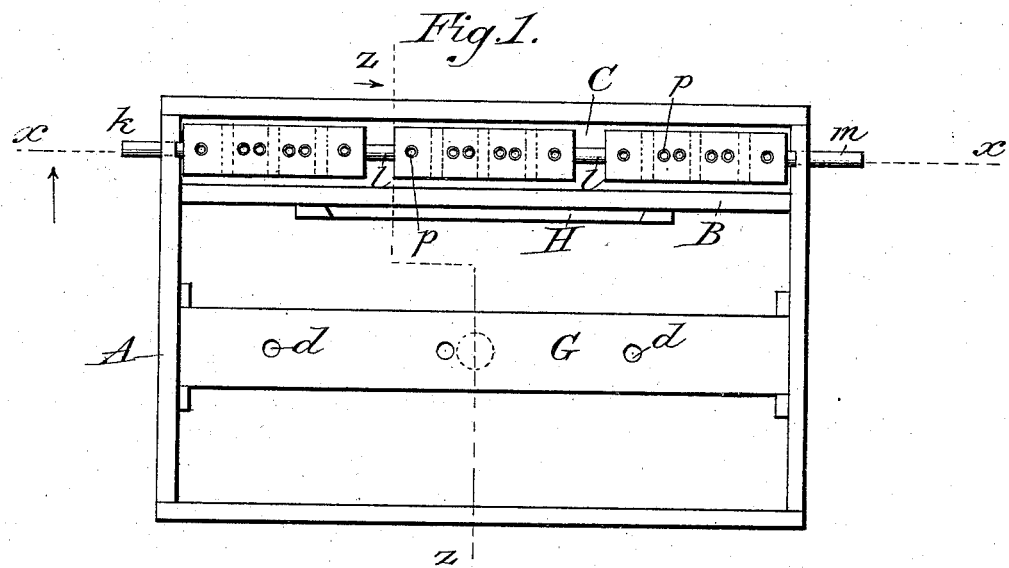
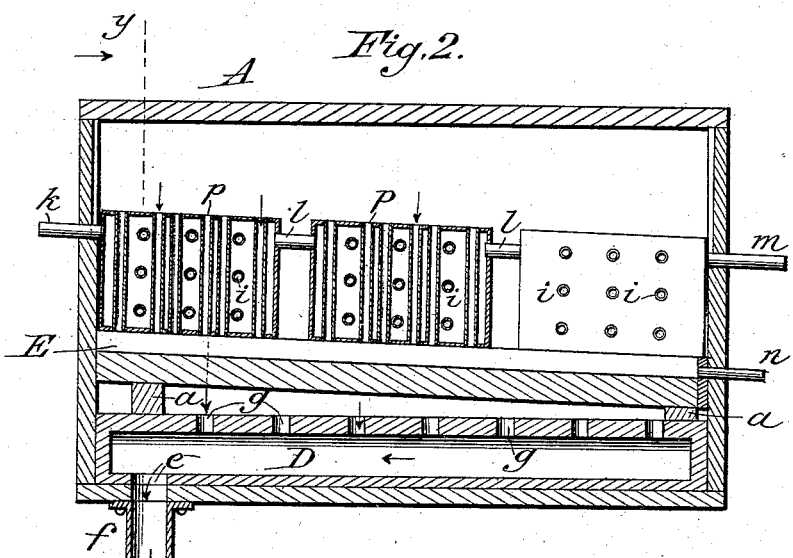
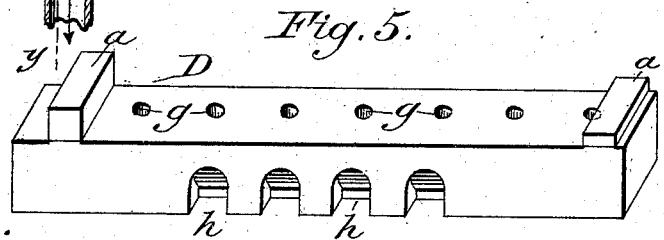
Attest:
F. H. Schott.
A. R. Brown.
Inventor:
Charles T. Whedon (No Model.)

C. T. WHEDON.
DRYING HOUSE.

No. 262,870. Patented Aug. 15, 1882.

Attest:
F. H. Schott
J. R. Brown

Inventor:
Charles T. Whedon

UNITED STATES PATENT OFFICE.

CHARLES T. WHEDON, OF WHITEFIELD, N. H., ASSIGNOR OF TWO-THIRDS TO ALSON L. BROWN AND WARREN G. BROWN, OF SAME PLACE.

DRYING-HOUSE.

SPECIFICATION forming part of Letters Patent No. 262,870, dated August 15, 1882.

Application filed December 10, 1881. (No model.)

*To all whom it may concern:*

Be it known that I, CHARLES T. WHEDON, a citizen of the United States, residing at Whitefield, in the county of Coos and State of New Hampshire, have invented certain new and useful Improvements in Dry Houses or Kilns, of which the following is a specification, reference being had therein to the accompanying drawings.

This invention relates to improvements in dry houses or kilns for drying lumber, malt, starch, or other articles requiring the aid of an artificial process for their proper desiccation, the object being to maintain a continuous circulation of air through the house, thereby withdrawing the moist air and condensing the moisture therein contained, as will be hereinafter more fully described.

Figure 3:
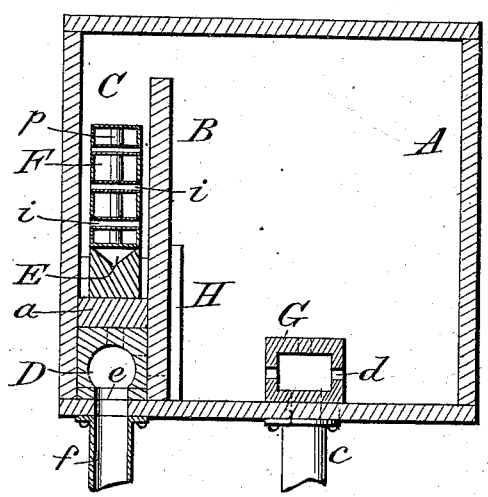
Figure 4:
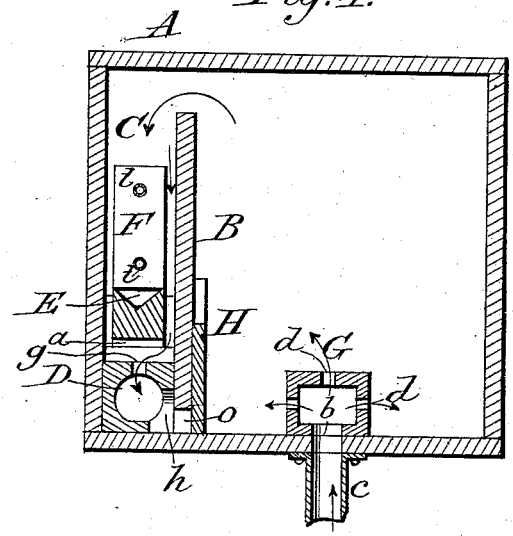
Figure 6:
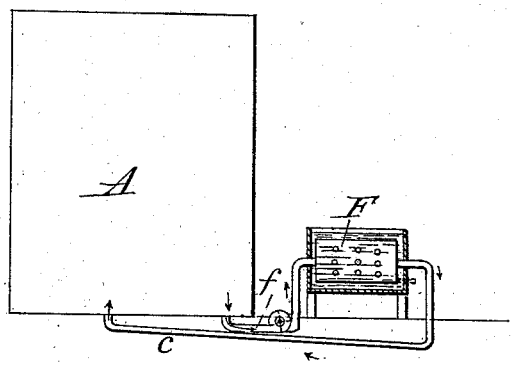

In the annexed drawings, Figure 1 is a plan view of my improved dry-house, the roof being removed; Fig. 2, a vertical longitudinal section of the same on the line $x\ x$ of Fig. 1. Fig. 3 is a transverse vertical section on the line $y\ y$ of Fig. 2; Fig. 4, a similar section on the line $z\ z$ of Fig. 1. Fig. 5 is a perspective view of an air-chamber, and Fig. 6 is a detailed view of a modification.

A represents a dry house or kiln constructed in the usual manner.

B is a partition or wall extending across the house from end to end and upward nearly to the roof, leaving an opening at the top, as shown. In the space or compartment C between this partition and the side of the house A is placed, resting on the floor of the house, the air-chamber D. This chamber extends the whole length of the house, and is of the same width as the space C, and fits snugly therein, as shown. Above this air-chamber D is placed a drip-trough, E, supported on said air-chamber by legs $a\ a$, of different heights, in order to give the trough the requisite inclination for carrying off the condensed moisture or drip. Resting on the top of this trough are the condensers F. The trough E and condensers F are of an equal but less width than the compartment C, and are so placed in said space as to leave a space or passage on each side of them for the passage of air to the air-chamber D, as clearly shown.

G is another air box or chamber, extending across the house near its middle and resting on the floor. It has a large hole or opening, $b$, in its bottom, which connects by a similar hole in the floor with the entrance-pipe $c$, for the admission of the dry air forced by a fan or blower to said chamber. Smaller holes, $d\ d$, are provided in the top and sides of this chamber for the escape of the dry air into all parts of the main house.

The air-chamber D has a large opening, $e$, in its bottom at one corner of the house, a similar opening being cut through the floor for the passage of air from the condensers to the pipe $f$. There are a series of apertures, $g\ g$, in the top of this chamber and several openings or doors, $h\ h$, in its side which is adjacent to the partition B, as shown in Fig. 5. Between this chamber D and the trough E is a space, as shown, for the passage of air from the condensers to the holes $g\ g$.

The condensers F, of any desired number, are rectangular boxes, having a number of vertical tubes, $p\ p$, passing through them, and also several rows of transverse horizontal tubes, $i\ i$, between the vertical ones $p\ p$, as shown. Through the condensers, around the tubes $p$ and $i$, circulates cold water, which is admitted by the inlet-pipe $k$, and passes from one condenser to the other by means of the connecting-pipes $l\ l$ and out by the pipe $m$.

The pipes $f$ and $c$, as shown in Fig. 6, are connected by a pipe having a blower or fan for creating a current of air.

The operation is as follows: The fan, being in motion, draws the moist air in the house through the space above the partition B into the compartment C and through the condensers by the tubes $p\ p$, its moisture condensing in said tubes, which are kept at a constant low temperature by the cold-water circulation around them, and, dripping into the trough E, passes out of the house by the pipe $n$. The air, thus deprived of its moisture, passes under the trough and through holes $g\ g$ into the air-chamber D, from whence it is withdrawn by the suction of the fan, which forces it through pipe $c$ into the air-chamber G, from which it escapes, in a divided state or in currents, by means of the apertures $d\ d$ into all parts of the house, where it circulates upward through the articles to be dried, absorbing moisture therefrom, and again passes out to the condensers, as before, as indicated by the arrows.

At the bottom of the partition B is an opening, o, of considerable length, which is closed by a slide, H, as shown in Fig. 4. When the fan is not in operation a circulation of air can be produced by raising the slide H, thus permitting the air to pass through the doors h h in the chamber D.

Instead of having the condensers placed inside of the house A, and with a circulation of cold water through their interiors, as above described, they may be placed outside the building, as shown in Fig. 6, where the condenser is submerged in cold water, and the atmosphere from the dry-house is passed through the inside of the same and the drip carried off by a drip-pipe at the bottom. In this method the fan must be constantly in operation. The circulation is indicated by the arrows in the figure.

By this improvement a continuous circulation of air is maintained, producing not only a more rapid condensation, but also obviating the great objection to other dry-houses, which do not carry off the moist atmosphere rapidly enough, thereby retarding the process of seasoning. Moreover, the circulation of dry air creates a great absorbent power, making the drying process very rapid, and also so uniform that the lumber in the center of the house is seasoned as rapidly as the outside of the pile, and is prevented from molding.

Having thus described my invention, what I claim as new, and desire to secure by Letters Patent, is—

1. The combination, in a dry-house, of a partition, B, provided with an opening, o, and slide H, a compartment, C, provided with condensers F, having tubes p i and connecting-pipes l, drip-trough E, air-chamber D, having holes g g, doors h h, and opening e, a blower or fan, pipes f c, and air-chamber G, having opening b and holes d, substantially as and for the purposes shown and described.

2. The combination, in a dry-house, of the condensers F, trough E, and air-chamber D, having holes g g, doors h h, and opening e, with the partition B, having opening o and slide H, and air-chamber G, provided with holes d and openings b, all arranged and operating in the manner and for the purpose substantially as shown and described.

3. An air-chamber, D, having opening e, doors h h, and holes g g, substantially as and for the purposes set forth.

In testimony whereof I affix my signature in presence of two witnesses.

CHARLES T. WHEDON.

Witnesses:
SAML. ALLARD,
JOHN G. TRULAN.